(12) United States Patent
Banginwar et al.

(10) Patent No.: US 11,520,297 B2
(45) Date of Patent: Dec. 6, 2022

(54) ENHANCING DIAGNOSTIC CAPABILITIES OF COMPUTING SYSTEMS BY COMBINING VARIABLE PATROLLING API AND COMPARISON MECHANISM OF VARIABLES

(71) Applicant: Intel Corporation, Santa Clara, CA (US)

(72) Inventors: Rajesh Banginwar, Bangalore (IN); Ramkumar Jayaraman, Bangalore (IN); Nabajit Deka, Bangalore (IN); Riccardo Mariani, Pisa (IT)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 16/370,461

(22) Filed: Mar. 29, 2019

(65) Prior Publication Data
US 2019/0235448 A1    Aug. 1, 2019

(51) Int. Cl.
*G06F 13/40*    (2006.01)
*G05B 9/02*    (2006.01)
(Continued)

(52) U.S. Cl.
CPC .............. *G05B 9/02* (2013.01); *G06F 9/541* (2013.01); *G06F 11/30* (2013.01); *G06F 13/4022* (2013.01); *H04L 12/40* (2013.01); *G06F 2213/0016* (2013.01); *G06F 2213/0026* (2013.01); *G06F 2213/0038* (2013.01); *H04L 2012/40215* (2013.01); *H04L 2012/40273* (2013.01)

(58) Field of Classification Search
CPC ....... G06F 9/541; G06F 13/4022; G05B 9/02; H04L 12/40
See application file for complete search history.

(56) References Cited

U.S. PATENT DOCUMENTS

| 4,099,234 A | 7/1978 | Woods et al. |
| 6,247,143 B1 | 6/2001 | Williams |

(Continued)

FOREIGN PATENT DOCUMENTS

WO    2018146220 A1    8/2018

OTHER PUBLICATIONS

Notice of Allowance dated Nov. 10, 2020 to U.S. Appl. No. 15/942,466.
(Continued)

*Primary Examiner* — Henry Tsai
*Assistant Examiner* — Christopher A Daley
(74) *Attorney, Agent, or Firm* — Spectrum IP Law Group LLC

(57) ABSTRACT

Methods and apparatus relating to enhancing diagnostic capabilities of computing systems by combining variable patrolling Application Program Interface (API) and comparison mechanism of variables are described. In one embodiment, a first processor core executes a first instance of a workload to generate a first set of safety variables. A second processor core executes a second instance of the workload to generate a second set of safety variables. A third processor core generates a signal in response to comparison of the first set of safety variables and the second set of safety variables. Other embodiments are also disclosed and claimed.

21 Claims, 9 Drawing Sheets

(51) Int. Cl.
*H04L 12/40* (2006.01)
*G06F 9/54* (2006.01)
*G06F 11/30* (2006.01)

(56) References Cited

U.S. PATENT DOCUMENTS

| | | | |
|---|---|---|---|
| 6,357,033 B1 | 3/2002 | Jippo | |
| 8,438,306 B2 | 5/2013 | Lescure et al. | |
| 8,930,752 B2 | 1/2015 | Gara et al. | |
| 10,908,583 B2 * | 2/2021 | Ueda | G05B 19/0425 |
| 10,946,866 B2 | 3/2021 | Fahim et al. | |
| 11,065,979 B1 * | 7/2021 | Demont | H01M 50/284 |
| 2002/0152418 A1 | 10/2002 | Griffin et al. | |
| 2002/0152420 A1 | 10/2002 | Chaudhry et al. | |
| 2003/0005380 A1 | 1/2003 | Nguyen et al. | |
| 2005/0240793 A1 | 10/2005 | Safford et al. | |
| 2006/0248288 A1 | 11/2006 | Bruckert et al. | |
| 2010/0138693 A1 * | 6/2010 | Ohkawa | G06F 11/1695 714/25 |
| 2011/0179308 A1 | 7/2011 | Pathirane et al. | |
| 2012/0131593 A1 * | 5/2012 | DePetro | G06F 9/5088 718/105 |
| 2012/0210164 A1 | 8/2012 | Gara et al. | |
| 2016/0359329 A1 * | 12/2016 | Kim | H02J 7/0013 |
| 2017/0192862 A1 * | 7/2017 | Xia | G06F 13/36 |
| 2017/0242693 A1 * | 8/2017 | Izaki | G06F 13/00 |
| 2018/0129573 A1 | 5/2018 | Iturbe et al. | |
| 2019/0163583 A1 | 5/2019 | Fahim et al. | |
| 2019/0182415 A1 | 6/2019 | Sivan | |
| 2019/0217857 A1 * | 7/2019 | Sorin | B60W 60/0016 |
| 2019/0258251 A1 * | 8/2019 | Ditty | G06K 9/00805 |
| 2019/0389602 A1 | 12/2019 | Schilling | |
| 2020/0074287 A1 * | 3/2020 | Mody | G06N 3/063 |
| 2020/0137580 A1 * | 4/2020 | Yang | H04W 4/44 |
| 2021/0165730 A1 * | 6/2021 | Surya | G06F 11/0772 |

OTHER PUBLICATIONS

Non-Final office action dated May 28, 2020, to U.S. Appl. No. 15/942,466.

* cited by examiner

FIG. 7

ENHANCING DIAGNOSTIC CAPABILITIES OF COMPUTING SYSTEMS BY COMBINING VARIABLE PATROLLING API AND COMPARISON MECHANISM OF VARIABLES

FIELD

The present disclosure generally relates to the field of electronics. More particularly, an embodiment relates to enhancing diagnostic capabilities of computing systems by combining variable patrolling Application Program Interface (API) and comparison mechanism of variables.

BACKGROUND

Electronic Control Unit (ECU) systems used in the automotive industry may cover an extensive array of functions associated with vehicle control and/or safety. For example, ECUs receive electrical signals from one or more sensors, evaluate them, and then calculate triggering signals for mechanical actuators. Proliferation of ECUs has raised concerns regarding maintaining vehicle control and/or safety in such systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 7 illustrates a sample sliding buffer data structure which can be used for storing and comparing the snapshot data, according to an embodiment.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, proliferation of ECUs has raised concerns regarding maintaining vehicle control and/or safety in the automotive industry. Moreover, electrical, electronics and programmable electronic systems (E/E/PS) used in automotive and/or (e.g., industrial) IOT (Internet Of Thing) systems generally need compliance with functional safety standards such as IEC-61508 and/or ISO-26262. In turn, computing platforms used in these E/E/PS systems may require built-in error diagnostics and error correction capabilities to uncover and/or recover from random hardware failures occurring in hardware elements such as CPU (Central Processing Unit or interchangeably referred to herein as "processor") cores, memories, and/or interconnects. These diagnostic capabilities can guarantee a fault-controlled environment for the execution of safety workloads, which can then be used to drive output interfaces such as actuators, motors, etc. Each CPU or processor may include one or more processor cores.

To this end, some embodiments relate to enhancing diagnostic capabilities of computing systems by combining variable patrolling Application Program Interface (API) and comparison mechanism of variables. The computing systems may include one or more processors and/or ECUs. One or more embodiments address provision of and/or enhancement(s) to the diagnostic capabilities of computing systems/platforms used in operational safety related systems, such as autonomous driving and/or TOT systems. However, embodiments are not limited to ECUs and one or more embodiments may be also applied for industrial safety that encompasses use cases like industrial PLC (Programmable Logic Controller), motion control, robotics, gateways, etc.

Figure 1:
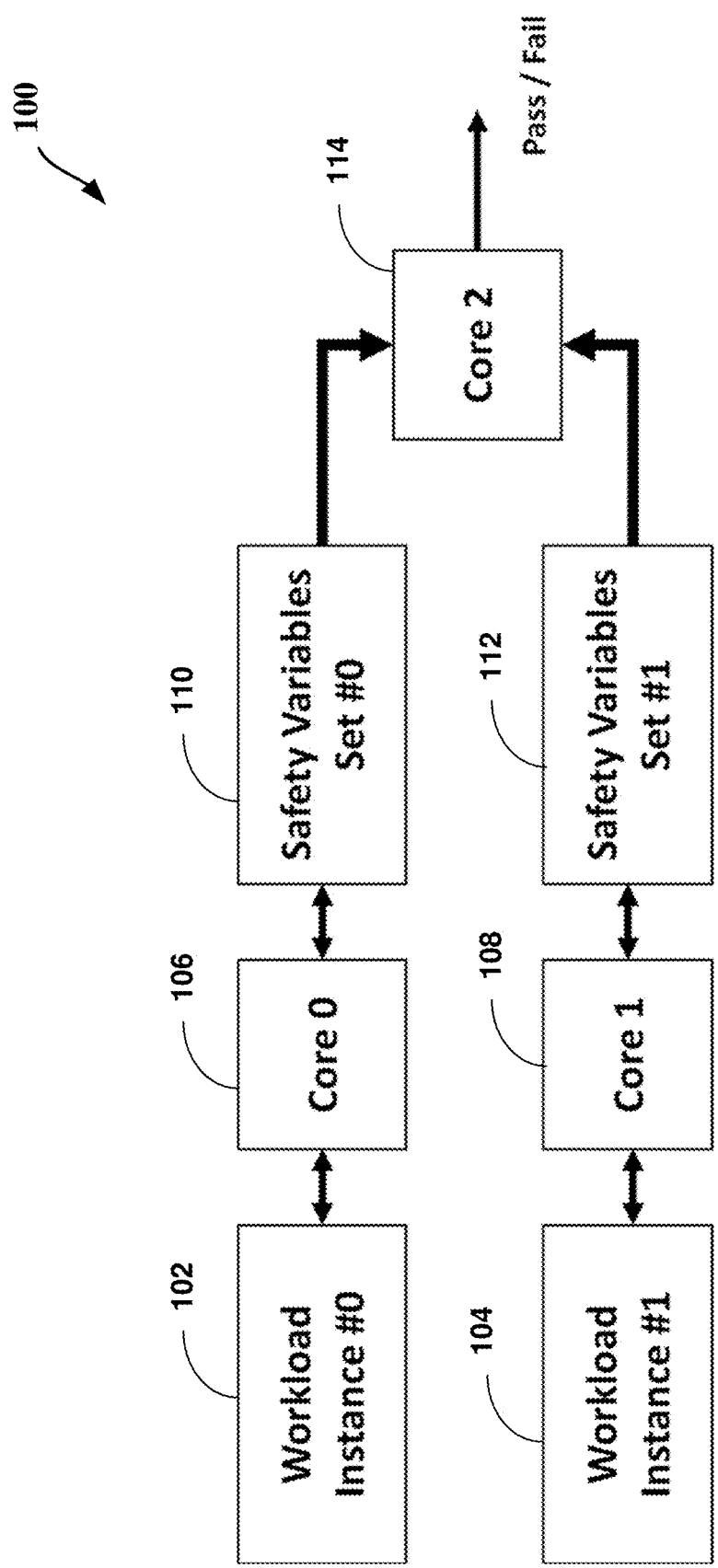
FIG. 1 illustrates a block diagram of an on-demand cross comparison system, according to an embodiment.

FIG. 1 illustrates a block diagram of an on-demand cross comparison system 100, according to an embodiment. As shown, two workloads 102/104 are executed on two separate processor cores 106/108 to determine respective safety variable sets 110/112. A third processor core 114 then compares the safety variable sets and generates a pass/fail result or output.

Generally, a safety application consists of a set of variables (known as safety variables) which effectively capture the state of the system it manages. These safety variables keep changing during the program execution. By executing two independent instances of the safety application on two independent CPU/processor cores and by using a third CPU/processor core to compare the two instances of safety variables, the diagnostic coverage of the computing platform can be significantly improved. This solution is herein referred to as On-Demand Cross Comparison (ODCC) and is presented diagrammatically in FIG. 1.

Moreover, traditional SoCs and processors are generally not developed in the context of functional safety and thus cannot be used for automotive and industrial use cases. To this end, some embodiments offer a technique to upgrade existing processor designs to functional safety grade with minimal effort. For example, logic (e.g., that may be implemented as software centric) does not require any modification to CPU/processor silicon design, and thus reduces the overall development time and/or costs. Also, no specialized tools may be necessary as control flow checkers and pre-pass compilers. Instead, customers/users may be provided with pre-built, pre-validated, and safety certified libraries for performing variable patrolling of safety variables with changes limited to application logic/layer.

In one embodiment, logic and/or various components (including one or more of the components discussed with reference to FIG. 1 et seq.) may be mounted or otherwise physically coupled to a vehicle. As discussed herein, a "vehicle" generally refers to any transportation device capable of being operated autonomously (with little or no human/driver intervention), such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle.

In at least one embodiment, On-Demand Cross Comparison (ODCC) can be considered as a logic or software based redundancy technique, which may be categorized under Loosely Coupled Lock Step systems (LCLS). As discussed herein, "ODCC" and "LCLS" may be used synonymously. Some operational principles of ODCC is provided in FIG. 1. ODCC may increase the diagnostic coverage (DC) by running the same exact workload on two different physical cores and comparing the state of safety variables continuously such that any mismatch in state variables is detected within the PST (Process Safety Time) interval.

Figure 2:
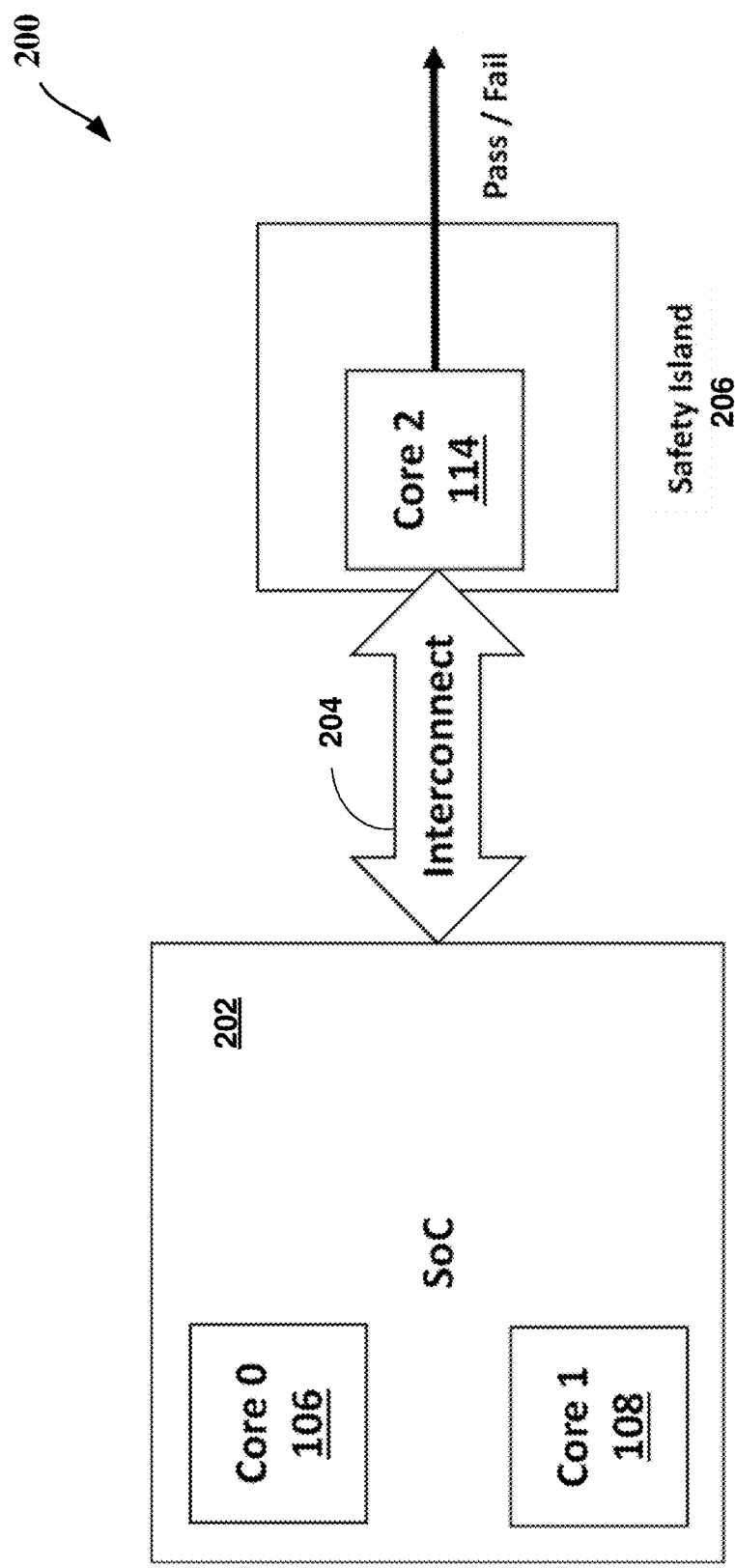
FIG. 2 illustrates a block diagram of a high level architecture for On-Demand Cross Comparison (ODCC), according to an embodiment.

FIG. 2 illustrates a block diagram of a high level architecture 200 for ODCC, according to an embodiment. In FIG. 2, the Core 0 and Core 1 are cores (e.g., could be any type of processor core including a general-purpose processor core, graphics processor core, etc. such as an Atom, Core™, or Xeon® based, provided by Intel® Corporation) which could be present in the SoC (System on Chip) or processor designs. These two cores are delegated with the task of executing the safety workloads and generating the signatures of the safety variables. A component/logic referred to as a Safety Monitor Device or Safety Island (or SI, such as an Intel Safety Island (ISI), provided by Intel Corporation) is provided in FIG. 2 which contains a lesser powerful and a small sized core (could be NIOS-II or ARM® or x86 CPU) indicated as Core 2. Core 2 runs a Real-Time Operating System (RTOS) based firmware (could be based on ThreadX™ or similarly capable RTOS) referred to as SI firmware (SI FW). The SI FW is delegated with the task of comparing the signatures generated by main CPUs.

The SoC and the SI component are coupled to communicate signals using interconnects (e.g., interconnect 204) such as an on-chip system fabric (such as Intel On-Chip System Fabric (IOSF)), Peripheral Component Interconnect express (PCIe), Controller Area Network (CAN) Bus (e.g., for the automobile industry applications), or any other interconnect. The SI could be implemented as an integrated solution, in which the SI is integrated as an Intellectual Property (IP) block within the chipset or even within the processor. The SI could also be implemented as a discrete off-chip solution, e.g., in form of a PCIe add-on card or as an Application Specific Integrate Circuit (ASIC), a programmable FPGA, or Field Programmable Gate Array (for example, soldered on the computing platform).

Further, keeping the SI (i.e., the comparator core) separate from (e.g., outside of) a traditional SoC boundary provides one or more of the following advantages: (1) from a safety perspective, there exist a possibility for common cause failure when the same CPU core generates the signature and performs the comparison operation (this can be eliminated when the comparator core (part of SI) performs the comparison); (2) the SI component can be added to an existing SoC design or processor design either as an integrated IP block or as a discrete add-on device (this means that customers/users using any existing processor designs and/or other Commercial, Off-the-Shelf (COTS) solutions are provided with an upgrade path to functional safety with minimal effort); and/or (3) for Hardware Fault Tolerant (HFT) architectures, the individual SIs presented in each computing platform (also known as channel) can be coupled together. This approach could help to improve the DC, and thus the overall safety integration levels. However, for the integrated version, the SI or safety monitor device is not outside of the SoC, but it is instead in a separate die which gives some degree of the aforementioned advantage(s) in another embodiment.

Figure 3:
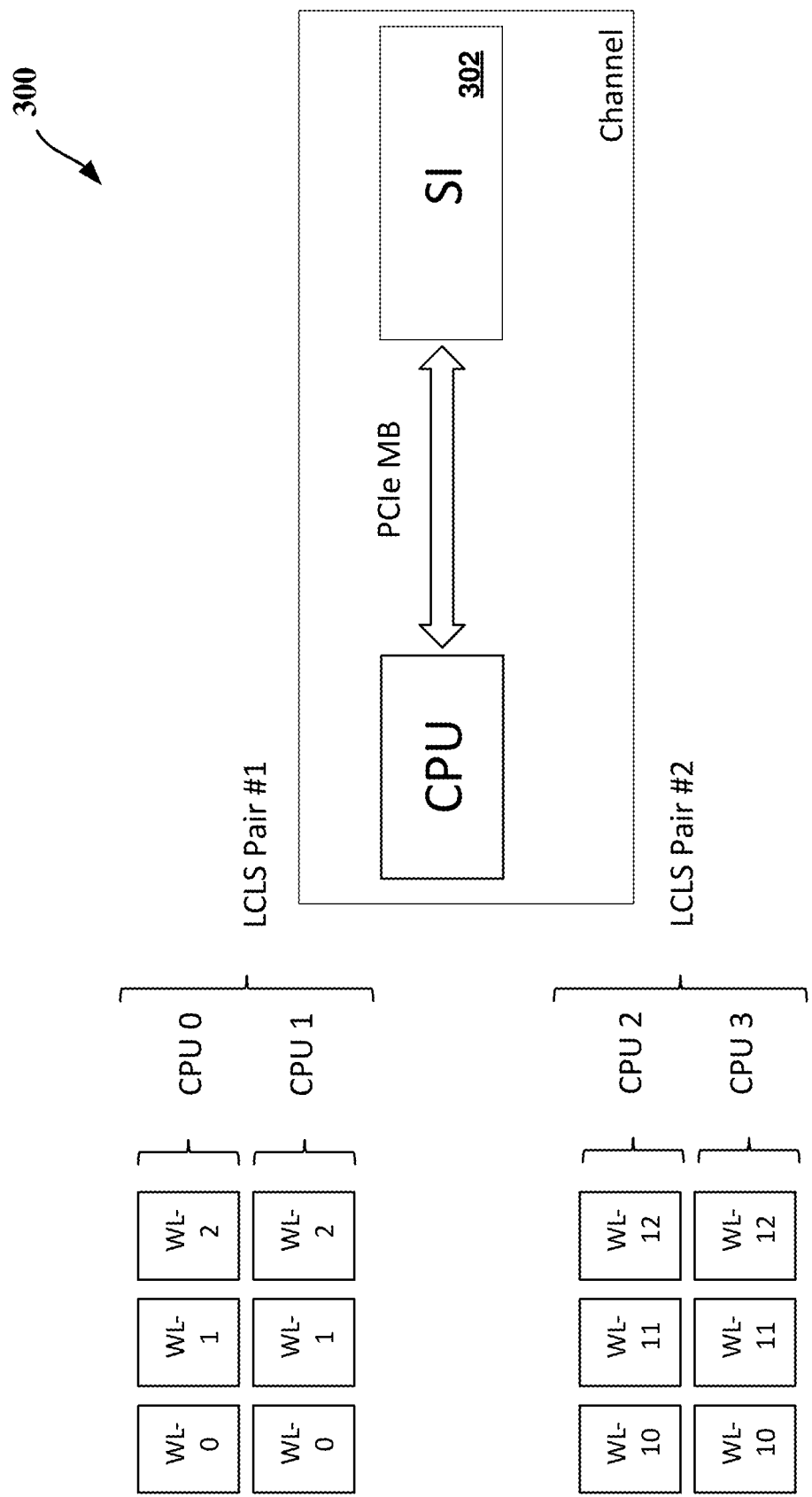
FIG. 3 and FIG. 4 illustrate block diagrams of high level hardware fault tolerant architectures, according to some embodiments.

FIG. 3 illustrates a block diagram of a high level hardware fault tolerant architecture 300, according to an embodiment. Generally, hardware fault tolerant (HFT) architectures offer the ability to provide the safety functionality even with one or more hardware faults. As discussed herein, 1oo1 indicates HFT=0 (or non-redundant system) and 1oo2 indicates HFT=1 (or redundant system), e.g., in accordance with IEC 61508. To implement such architectures based on some embodiments, multiple computing platforms (known as channels) are used and the SIs of those channels are interconnected. These SIs perform the cross comparison of signatures. Hence, the architecture 300 provides ODCC in HFT architectures according to one embodiment. Unlike traditional solution of HFT=1 system, where the comparison is done in one entity, here the comparison is performed in two independent SI, making the SI implementation redundant.

In an embodiment, an Atom® processor (e.g., provided by Intel® Corporation) based SoC may be provided with four cores used for executing the safety workloads. Out of four cores, it is possible to construct two LCLS pairs of CPUs for workload execution. In FIG. 3, CPU0 and CPU1 act as LCLS Pair 1 and CPU2 and CPU3 act as LCLS Pair 2. Safety workloads given by WL-0, WL-1 and WL-2 execute on CPU0 and CPU1 (part of LCLS Pair 1), while safety workloads given by WL-10, WL-11 and WL-12 execute on CPU2 and CPU3 (part of LCLS Pair 2). Signatures generated by a given workload by duplicated execution on CPU0/CPU1 and CPU2/CPU3 are compared by the SI 302 (i.e., there are two pairs of comparison operations for two different WLs, one pair is for CPU0 vs. CPU1 and the other pair is for CPU2 vs. CPU3).

Figure 4:
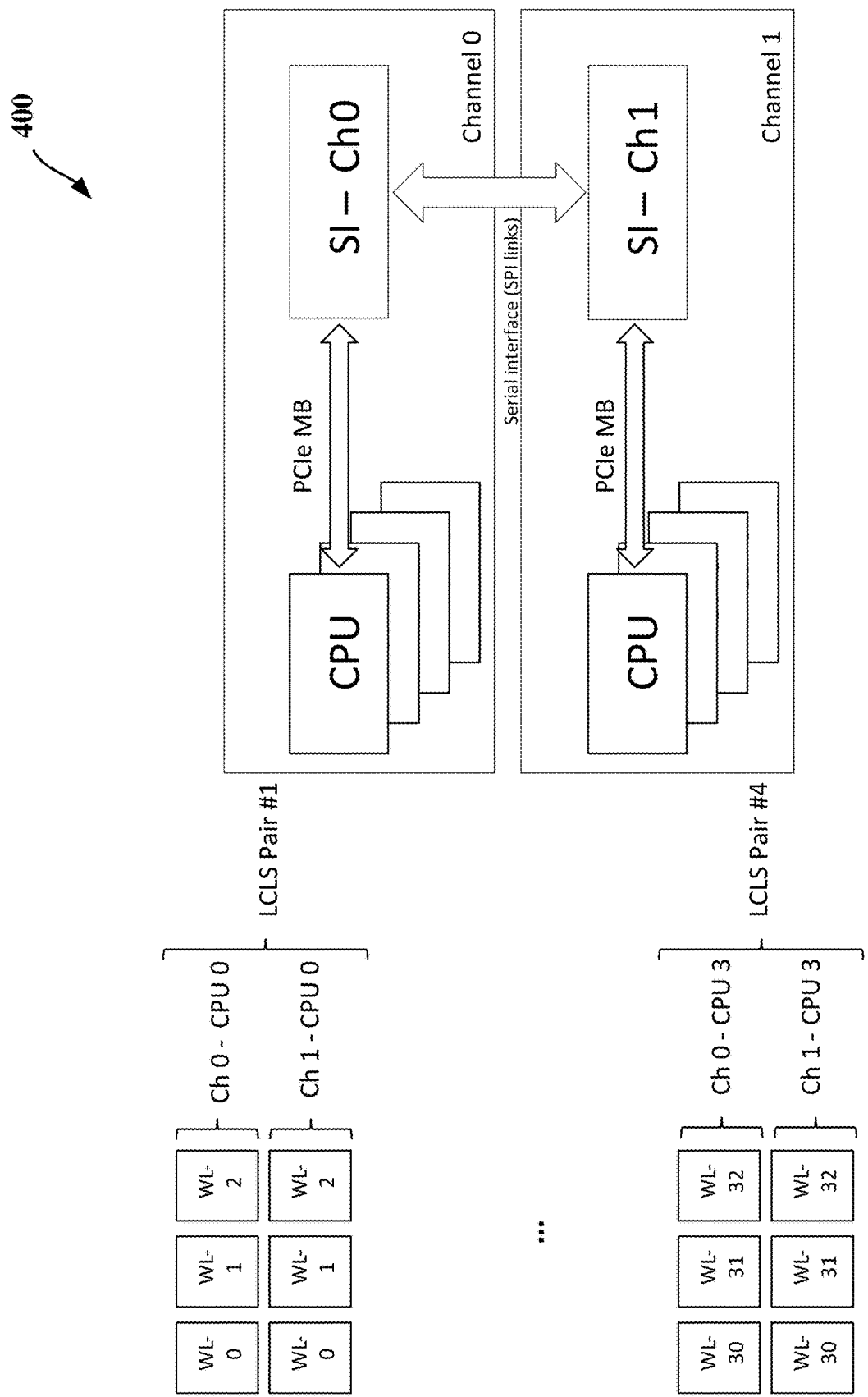

FIG. 4 illustrates a block diagram of a high level hardware fault tolerant architecture 400, according to an embodiment. In FIG. 4, the SIs of the two computing channels (i.e., Ch0 and Ch1) are interconnected together using a serial link such as a Serial Peripheral Interface (SPI), I2C (Inter-Integrated Circuit), or I3C® (or SenseWire). The CPU0s of both channels acts as LCLS Pair 1, CPU1s of both channels acts as LCLS Pair 2 and so on. The FIG. 4 CPU numbers refer to the corresponding CPU of the other channel (device) which runs the same set of WLs, e.g., WL-0 to WL-2. Safety workloads given by WL-0, WL-1 and WL-2 are executed on CPU0s of both channels. Signature generated by a given workload by duplicated execution on both the channel's cores are then compared by the SIs of both the channels. If one of the comparison fails, it is treated as an ODCC failure condition, and the system is put into safe state as a result of ODCC failure(s).

Figure 5:
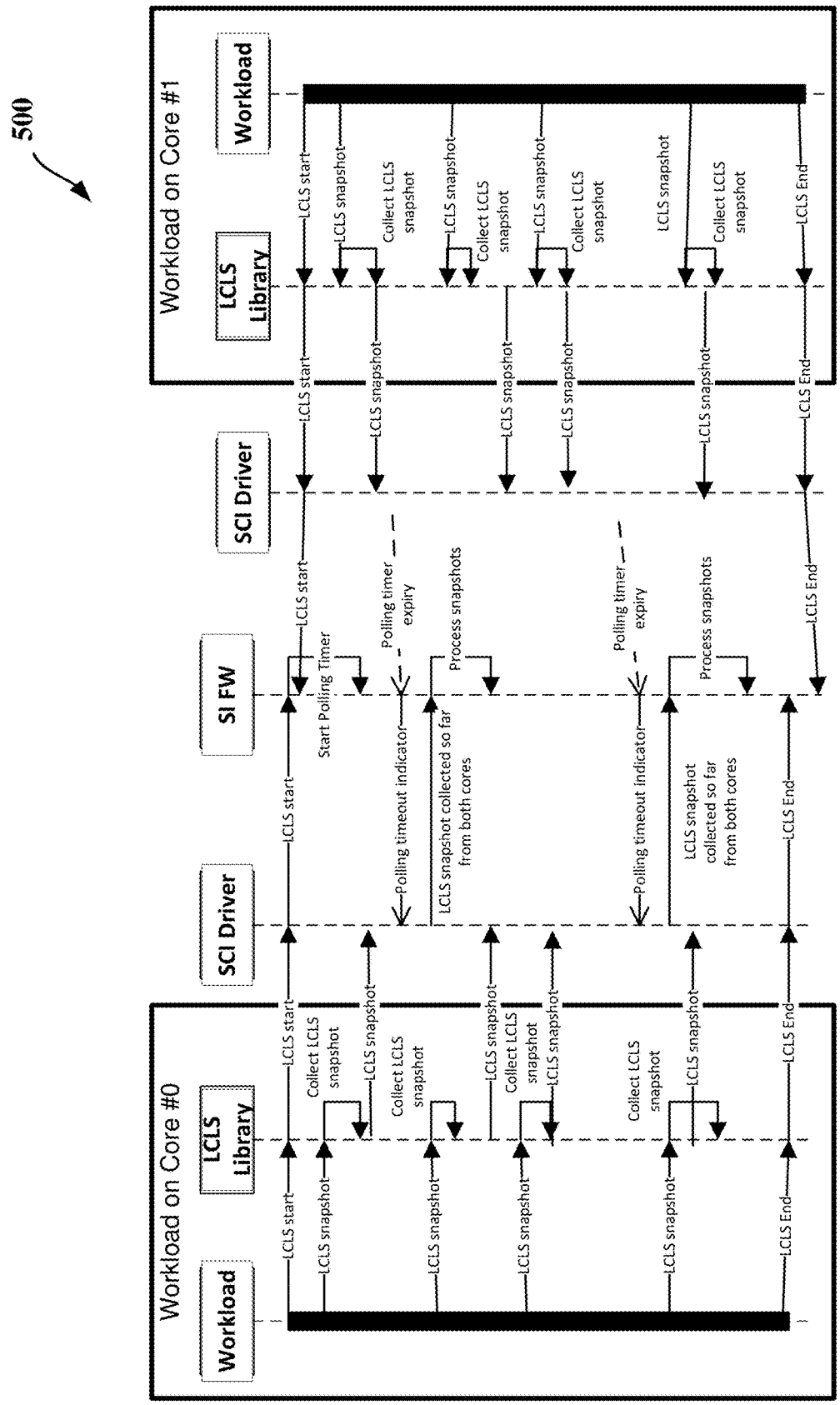
FIGS. 5 and 6 illustrate system level flows for ODCC of configurations of FIGS. 3 and 4, respectively, according to some embodiments.
Figure 6:
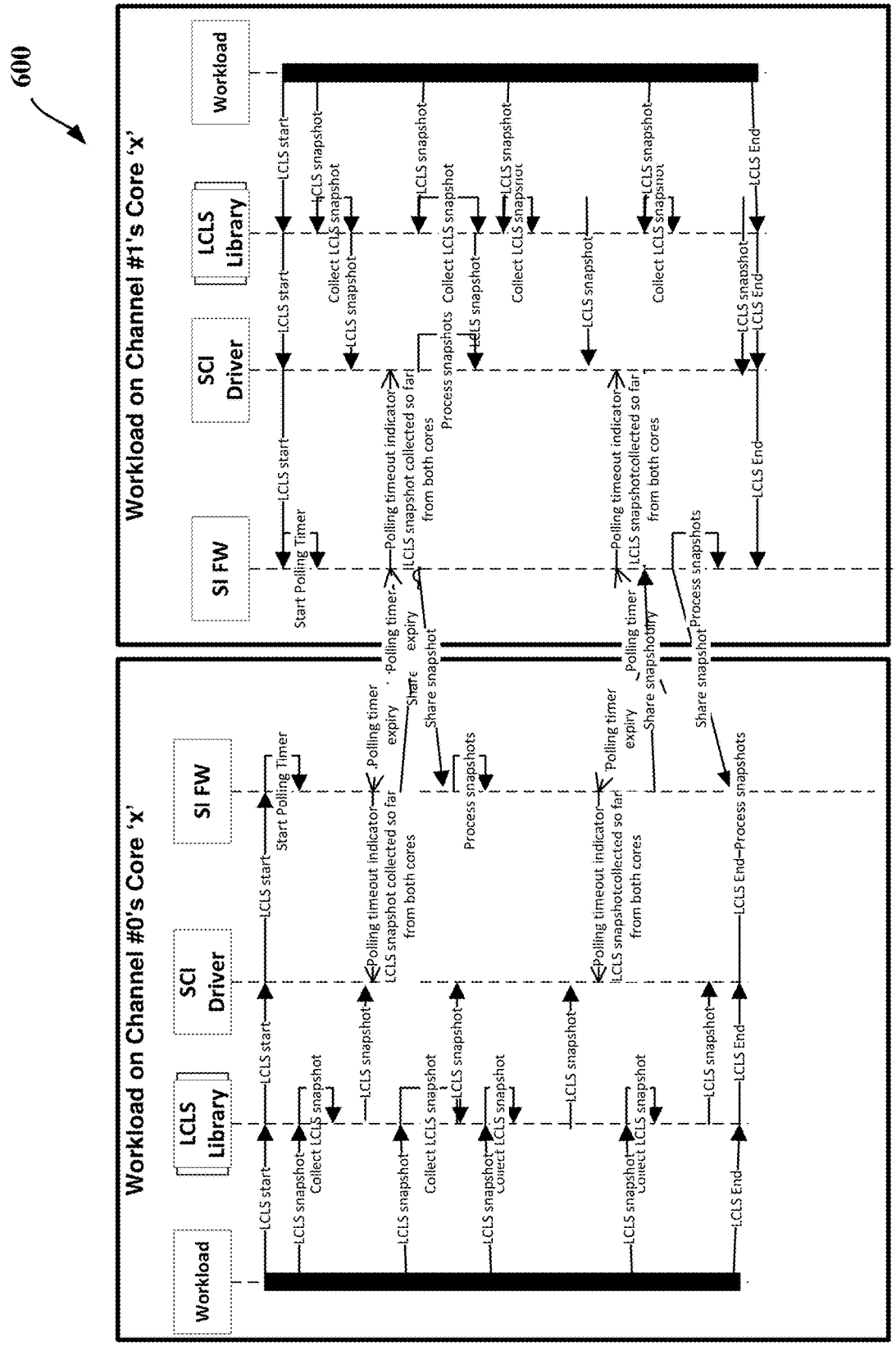

FIGS. 5 and 6 illustrate system level flows for ODCC of configurations of FIGS. 3 and 4, respectively, according to some embodiments. The customer's/user's safety application or workload is modified to compute the signatures of its safety variables at specific points. This could be a few millisecond to even a few hours as determined by the customer's end use case/application. The signatures are computed using Cyclic Redundancy Code or CRC (such as 32-bit CRC or CRC-32) or any other hashing or signature evaluation algorithm. This signature is then accumulated across all workloads and stored in the host (either as part of workloads or driver or in a global store) along with the other details such as core identifier (ID), workload ID, snapshot ID, type details, and/or timestamp. This is referred to as a LCLS snapshot or ODCC snapshot.

The ODCC snapshot uniquely identifies the signature corresponding to a given safety workload at any given time during its execution. It is possible for the customers to customize the ODCC/LCLS Library by overriding and plugging in their own signature evaluation algorithm. The SI FW (e.g., implementing the cross comparator logic) periodically collects the set of ODCC snapshots from the host's space. The transfer of the ODCC snapshots could be over the messages over interconnect (such as PCIe mailbox) or a Direct Memory Access (DMA) engine could be used for speed-up. As discussed herein, the term "driver" generally refers to a software device driver, e.g., for the SI depending on how the SI is attached or integrated, on PCIe, on SPI, etc.

In case of FIG. 3 architecture, the SI FW performs the comparison of signatures generated by the two independent cores which execute the same workload. In case of FIG. 4 architecture, the SI FW exchanges the collected signatures with the peer SI FW for cross comparison.

Due to the workload execution drifts, both cores may not send exactly same set of snapshots at any given time. This means, some extra snapshots may be received from one of the cores while the other cores might be lagging. These extra snapshots are stored for processing for the next time interval. This has implications on how we prove PST (Process Safety Time) requirements. For the snapshots which are stored for processing in next PST period, the fault detection time now becomes more than the PST. Moreover, the faults in this case are detected within (PST+time lag between the two cores). To mitigate this delay, one of the options is to reduce the SI FW's polling timer (e.g., to half of PST). The polling time interval is defined as the time at which the SI FW requests for the snapshots from the host. The polling time interval is provided by the formula given below:

Polling time interval=(PST−2 mS)/2

For example, a PST requirement of 10 mS (milli Second) as in an example platform translates to a polling time interval of 4 mS.

From a host software stack perspective, there are different ways to execute the workloads. (i) Single OS (Operating System) where system software ensures the workload/application runs on two cores in parallel. In this case combination of application, middleware and OS will ensure that the same workload or application is executed simultaneously on two cores. In this case the expectation is that I/O (input/output) is managed in such a way that the application does not detect the difference, i.e., both instances get the input at the same time without extra delays (for example, using master/slave mechanism where one of the workload instance acts as a master and owns the I/O and other instance receives the I/O from master or using any other mechanism, e.g., based on software end-to-end safety protocols for communication channels). (ii) Two VMs (Virtual Machines) running on two separate cores that run the same workload or application in parallel with a third VM managing the SI interaction (e.g., in addition to other service related housekeeping). In this case, the VMM (Virtual Machine Manager) or other system software mechanisms ensure the applications are started at the same time and similar to first option I/O is managed using black channel or other mechanism to ensure both application instances get a copy of the input at the same time (i.e., without extra delay).

In both cases (and any other configurations), the workload may run for few milliseconds to few hours as it is very much customer application/usage specific. Since the OS is running the workload on two cores, it is expected that the two cores will not be executing exactly the same set of instructions at the same time. There will be some time-lag between two core executions.

In some embodiments, the system will support multiple applications or workloads running in parallel on the same two cores using an OS-based time slicing mechanism. Since these workloads are running on two cores, it can be assumed that these are running in two separate memory address spaces. This assumption is made to ensure FFI (Freedom From Interference) between the two instances and ease of use/development/deployment. In at least one embodiment, if the workload is not executing continuously, it can be assumed that comparator logic in SI will not be active while safety workloads are not active. This is because, the required DC for these workloads are needed only when that workload is active.

Figure 7:
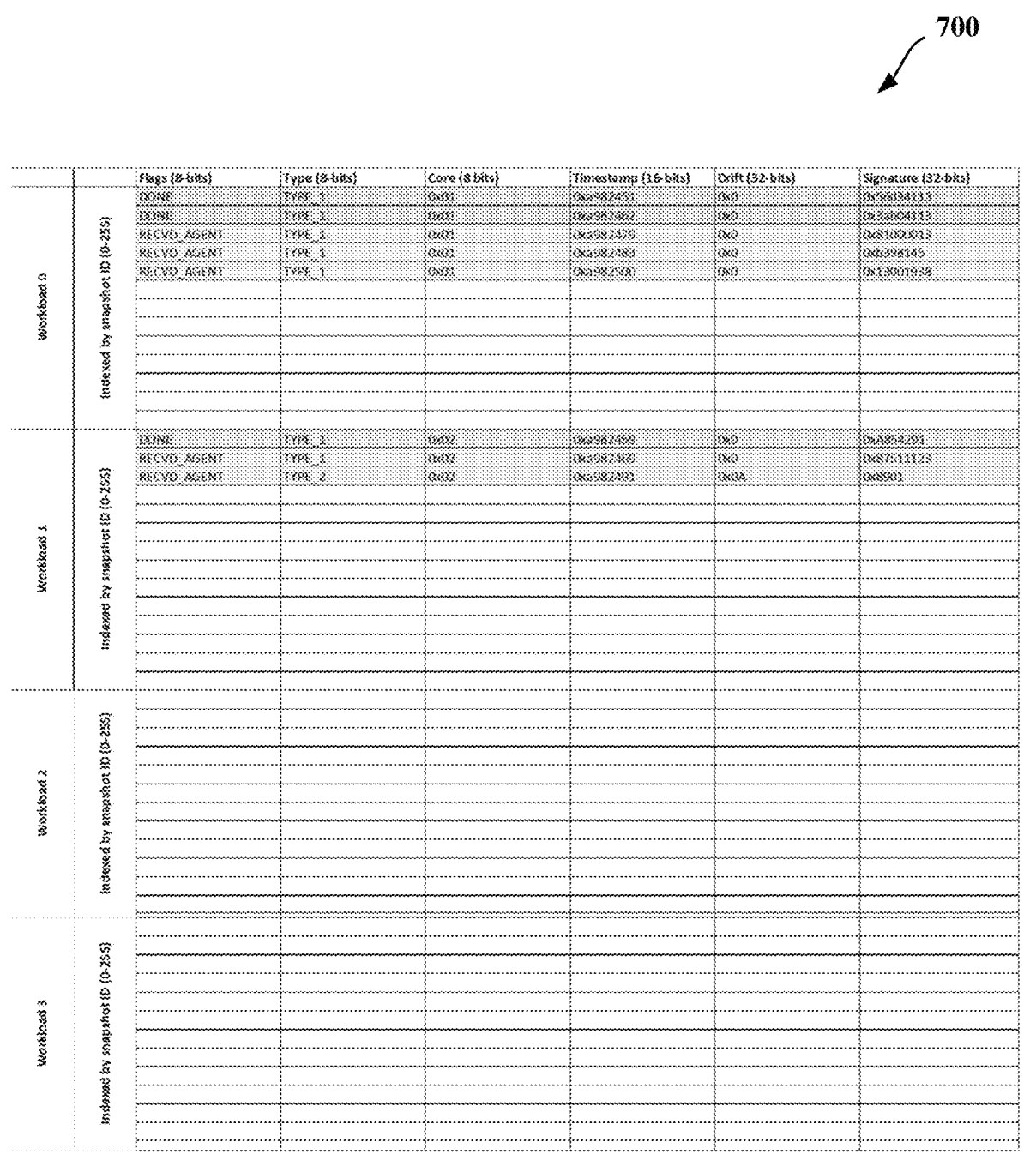

FIG. 7 illustrates a sample sliding buffer data structure 700 which can be used for storing and comparing the snapshot data, according to an embodiment. The algorithm for ODCC feature which is implemented as a part of SI firmware (FW) is discussed below. The SI FW needs to know the mode of operation, e.g., the architecture of FIG. 3 or 4 for performing the comparison. To accommodate the leads/lags in snapshot data, a sliding buffer is used to accumulate and perform the comparison of signatures.

As shown in FIG. 7, the sliding buffer is indexed based on workload ID and snapshot ID. Any incoming snapshot is inserted into the sliding buffer based on the workload ID and snapshot ID. The flags field corresponding to that entry is then updated appropriately (whether the snapshot is received from first agent, comparison is done, etc.). The second receipt of a snapshot triggers the actual comparison operation.

Referring to FIGS. 5-7, the overall algorithm with the comparison operation carried at the SI FW is discussed as below.

1. Set up a polling timer based on PST requirements. The polling timer interval is provided based on the equation given in previous section. A polling timer interval of 4 mS is used to provide a guarantee of 10 mS PST. The timer is not activated to start with.

2. The polling timer is activated when the first Start LCLS message is received from any of the workload.

3. On polling timer's expiry, perform the following:
   i. Re-activate the polling timer for next time interval
   ii. Send a LCLS Snapshot request message to the host to query the DMA memory region where the snapshots are accumulated at the host end.
   iii. Ensure the response to the LCLS Snapshot request arrives within a pre-determined time (e.g., using a separate timer). The response message contains the starting address and size of the DMA region, which contains the snapshot data.
   iv. Program the DMA engine to copy the snapshot data from the host space to SI space. This results in moving all the snapshot entries collected so far at the host's end to SI FW.

v. Parse the incoming snapshot data and insert the snapshots to the sliding buffer based on the workload ID, mode of operation and interface on which the response is received.

4. Perform the comparison on all pending snapshots as follows:
   i. In case of safety variables comparison (e.g., given by Type=0x01), compare the signature directly and in case of a match ensure the timestamp is within PST requirements.
   ii. In case of analog variables (e.g., given by Type=0x02/0x03), ensure the value of variable is within the tolerance band. The tolerance value is either provided as absolute number or expressed as a percentage.

By contrast, some implementations may be can be categorized as hardware based and software based approaches. Example for hardware based approaches include the use of watchdog processors, lock stepping, or use of checkers. Lock stepping can be used, for example. It involves the use of two or more independent cores to execute the same CPU instruction and then compare the outputs on a clock cycle basis. Hardware architectures based on tightly coupled locked step, such as dual-core locked steps (DCLS), are based on lock stepping techniques. Software based techniques involve the use of a multi-core hardware architecture to execute duplicated code and then perform comparison of outputs. Typically, a pre-pass compiler is used to perform procedural level duplication and automatically insert the fault detection code. The resulting executables are then run on independent cores of a multi-core hardware to provide software redundancy. Other software based approaches such as control flow checking involve the generation of a signature at a basic block level which are then compared during control transfers (such as branch instructions).

However, hardware based approaches based on lock stepping generally require duplicating the physical CPU cores as well as including a comparator unit(s) in hardware to perform per-cycle output comparison(s). This results in additional development and validation effort/costs. Though the execution of instructions on duplicated cores help in uncovering faults occurring in the core sub-system, the memory and interconnect components end up as sources for common cause failures. This requires additional safety mechanism to uncover faults in the memory and interconnect components. This approach may also limit the effective available performance when a safety workload is only a small portion of total workload irrespective of amount of safety workload the cores has to be lock-stepped.

Further, software based approaches such as the use of pre-pass compilers and control flow checking schemes are based on specialized tools, which are architecture dependent and thus may require additional development/porting effort for newer CPU architectures. A major drawback in these systems can be that the signature generating core is often used to perform the signature comparison. This can end up as a source of common cause failure. It is possible for a faulty core to generate a non-identical signature yet provide a false positive result during comparison. Hence, the diagnostic coverage that can be claimed by these mechanisms can be limited and may depend on various implementation factors. Also, they may require extensive expertise of a core design to implement such mechanisms, which would create a considerable amount of efforts for the system integrators.

Figure 8:
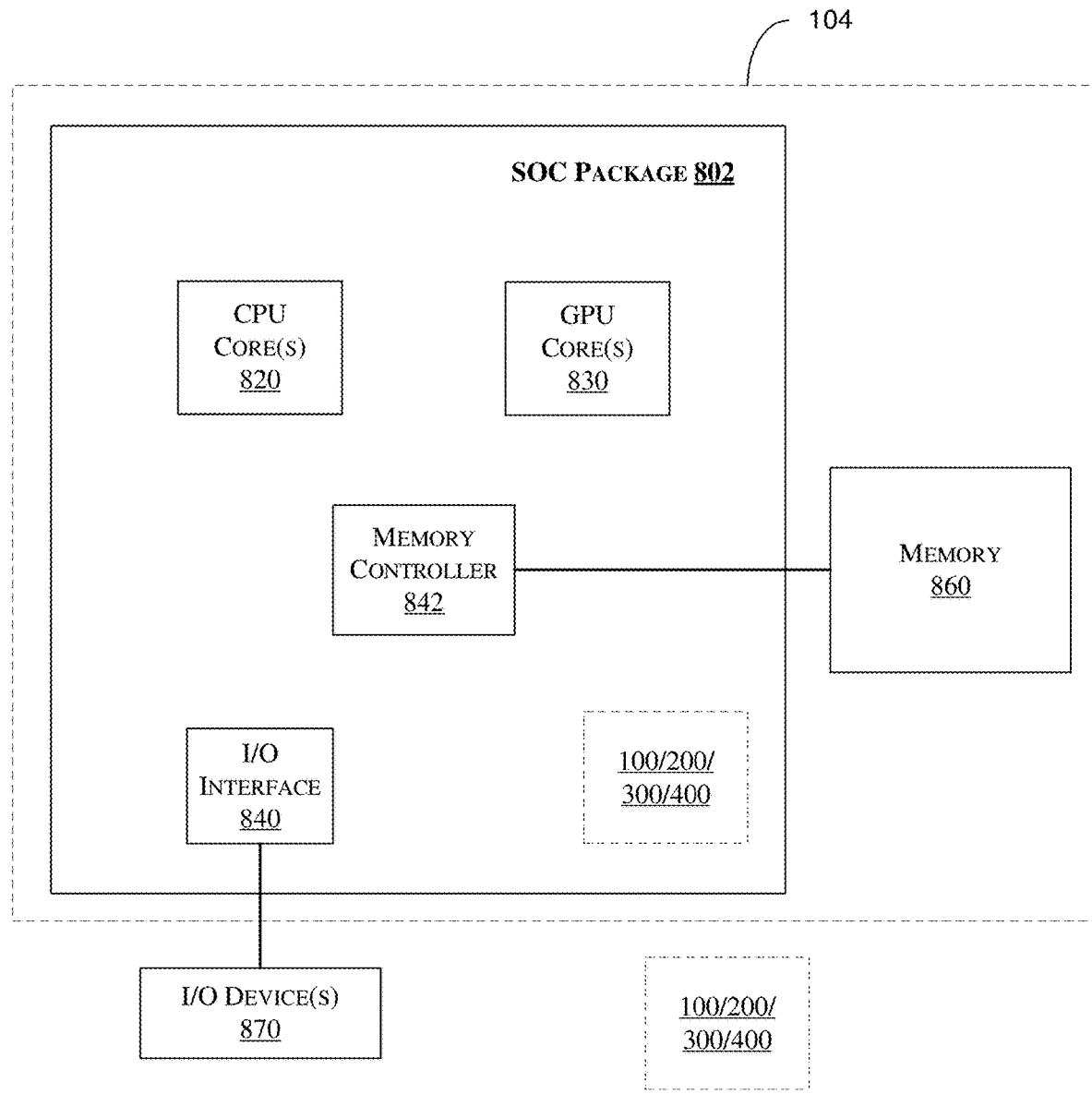
FIGS. 8 and 9 illustrates block diagrams of embodiments of computing systems, which may be utilized in various embodiments discussed herein.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
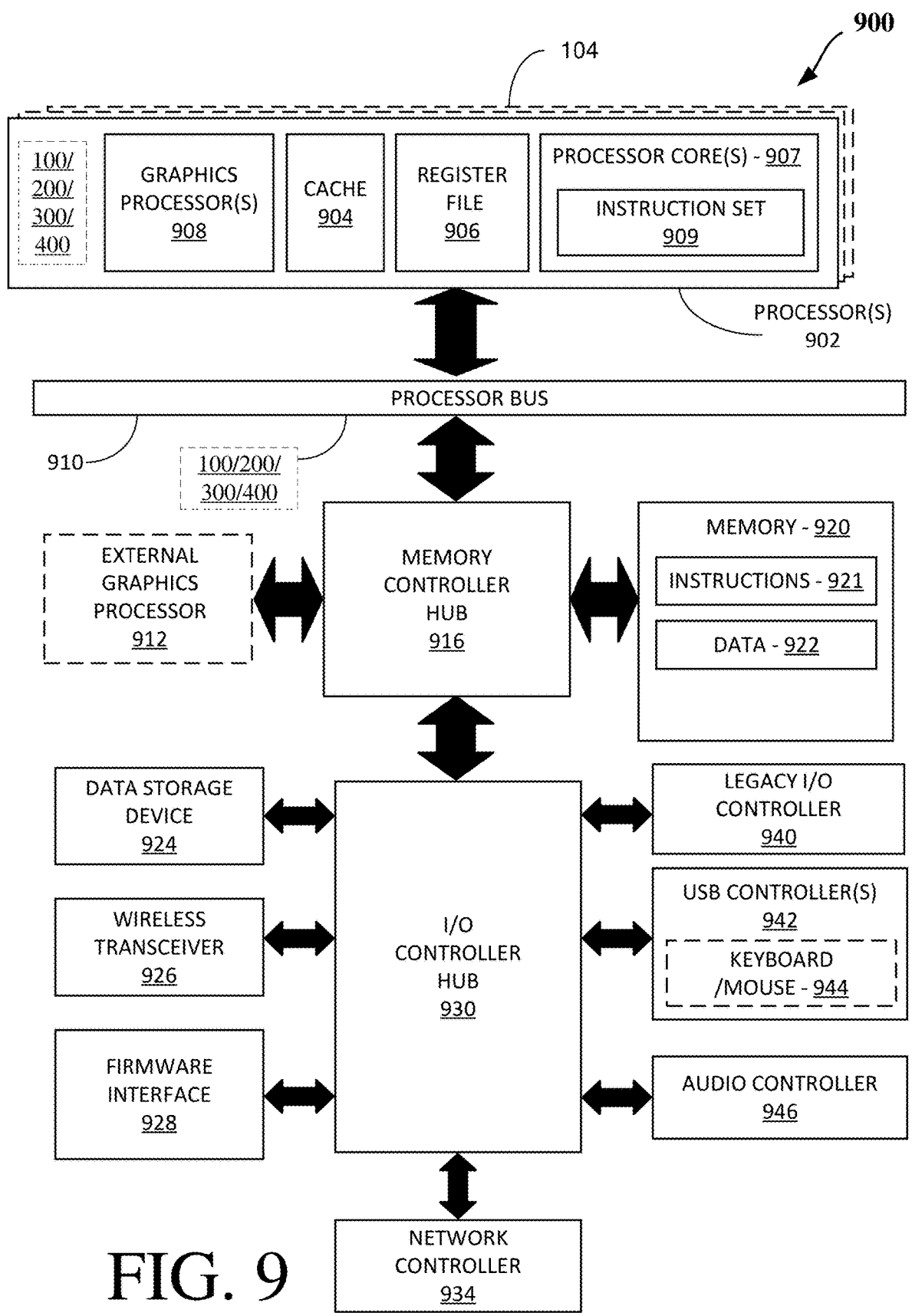

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

The following examples pertain to further embodiments. Example 1 includes an apparatus comprising: a plurality of processor cores to execute one or more workloads corresponding to operations of one or more components of a vehicle; a first processor core from the plurality of processor cores to execute a first instance of a workload to generate a first set of safety variables; a second processor core from the plurality of processor cores to execute a second instance of the workload to generate a second set of safety variables; and a third processor core from the plurality of processor cores to generate a signal in response to comparison of the first set of safety variables and the second set of safety variables. Example 2 includes the apparatus of example 1, wherein the third processor core is to detect a mismatch between the first set of safety variables and the second set of safety variables within a process safety time interval. Example 3 includes the apparatus of example 1, wherein a system on chip comprises the first processor core and the second processor core, wherein a safety island comprises the third processor core. Example 4 includes the apparatus of example 3, wherein the system on chip and the safety island are coupled via an interconnect. Example 5 includes the apparatus of example 4, wherein the interconnect comprises one or more of: an on-chip system fabric, a Peripheral Component Interconnect express (PCIe), and a Controller Area Network (CAN) Bus. Example 6 includes the apparatus of example 1, wherein a processor comprise the plurality of processor cores. Example 7 includes the apparatus of example 1, wherein a System On Chip (SOC) device comprises the plurality of processor cores, memory, and a CAN Bus. Example 8 includes the apparatus of example 1, wherein an Internet of Things (IoT) device or vehicle comprises one or more of: the plurality of processor cores and memory. Example 9 includes the apparatus of example 1, wherein the vehicle is one of: an automobile, a truck, a motorcycle, an airplane, a helicopter, a vessel/ship, a train, or a drone. Example 10 includes an apparatus comprising: a plurality of processor cores to execute one or more workloads corresponding to operations of one or more components of a vehicle; and a first processor core from the plurality of processor cores to execute a first instance of a first plurality of workloads to generate a first set of safety variables; a second processor core from the plurality of processor cores to execute a second instance of the first plurality of workloads to generate a second set of safety variables; and a third processor core from the plurality of processor cores to generate a signal in response to comparison of the first set of safety variables and the second set of safety variables. Example 11 includes the apparatus of example 10, wherein the third processor core is to detect a mismatch between the first set of safety variables and the second set of safety variables within a process safety time interval. Example 12 includes the apparatus of example 10, wherein a system on chip comprises the first processor core and the second processor core, wherein a safety island comprises the third processor core. Example 13 includes the apparatus of example 10, wherein the vehicle is one of: an automobile, a truck, a motorcycle, an airplane, a helicopter, a vessel/ship, a train, or a drone.

Example 14 includes an apparatus comprising: a first processor core of a first computing channel to execute a first instance of a first plurality of workloads; a first processor core of a second computing channel to execute a second instance of the first plurality of workloads; and an interconnect to couple safety islands of the first computing channel and the second computing channel, wherein the first plurality of workloads correspond to operations of one or more components of a vehicle. Example 15 includes the apparatus of example 14, wherein the interconnect comprises one or more of: a Serial Peripheral Interface (SPI), an I2C (Inter-Integrated Circuit) interface, and a SenseWire™ interface. Example 16 includes the apparatus of example 14, further comprising: a first processor core of a third computing channel to execute a first instance of a second plurality of workloads; and a first processor core of a fourth computing channel to execute a second instance of the second plurality of workloads, wherein the interconnect is to couple safety islands of the third computing channel and the fourth computing channel. Example 17 includes the apparatus of example 14, wherein the vehicle is one of: an automobile, a truck, a motorcycle, an airplane, a helicopter, a vessel/ship, a train, or a drone.

Example 18 includes one or more computer-readable medium comprising one or more instructions that when executed on at least one processor configure the at least one processor to perform one or more operations to: execute one or more workloads corresponding to operations of one or more components of a vehicle; execute, at a first processor core of the processor, a first instance of a workload to generate a first set of safety variables; execute, at a second processor core of the processor, a second instance of the workload to generate a second set of safety variables; and cause generation of a signal, at a third processor core of the processor, in response to comparison of the first set of safety variables and the second set of safety variables. Example 19 includes the one or more computer-readable medium of example 18, further comprising one or more instructions that when executed on the at least one processor configure the at least one processor to perform one or more operations to cause detection of a mismatch, at the third processor core, between the first set of safety variables and the second set of safety variables within a process safety time interval. Example 20 includes the one or more computer-readable medium of example 18, further comprising one or more instructions that when executed on the at least one processor configure the at least one processor to perform one or more operations to cause transmission of data between two of the first processor core, the second processor core, and the third processor via an interconnect.

Example 21 includes a method comprising: executing one or more workloads corresponding to operations of one or more components of a vehicle; execute, at a first processor core of a processor, a first instance of a workload to generate a first set of safety variables; executing, at a second processor core of the processor, a second instance of the workload to generate a second set of safety variables; and causing generation of a signal, at a third processor core of the processor, in response to comparison of the first set of safety variables and the second set of safety variables. Example 22 includes the method of example 21, further comprising causing detection of a mismatch, at the third processor core, between the first set of safety variables and the second set of safety variables within a process safety time interval. Example 23 includes the method of example 21, further comprising performing one or more operations to cause transmission of data between two of the first processor core, the second processor core, and the third processor via an interconnect.

Example 24 includes a method comprising: executing, at a first processor core of a first computing channel, a first instance of a first plurality of workloads; and executing, at a first processor core of a second computing channel, a second instance of the first plurality of workloads, wherein an interconnect is to couple safety islands of the first computing channel and the second computing channel, wherein the first plurality of workloads correspond to operations of one or more components of a vehicle. Example 25 includes the method of example 24, wherein the interconnect comprises one or more of: a Serial Peripheral Interface (SPI), an I2C (Inter-Integrated Circuit) interface, and a SenseWire™ interface. Example 26 includes the method of example 24, further comprising: executing, at a first processor core of a third computing channel, a first instance of a second plurality of workloads; and executing, at a first processor core of a fourth computing channel, a second instance of the second plurality of workloads, wherein the interconnect is to couple safety islands of the third computing channel and the fourth computing channel. Example 27 includes the method of example 24, wherein the vehicle is one of: an automobile, a truck, a motorcycle, an airplane, a helicopter, a vessel/ship, a train, or a drone.

Example 28 includes an apparatus comprising means to perform a method as set forth in any preceding example. Example 29 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a plurality of processor cores to execute one or more workloads corresponding to operations of one or more components of a vehicle;
   a first processor core from the plurality of processor cores to execute a first instance of a workload to generate a first set of safety variables during a first time period;
   a second processor core from the plurality of processor cores to execute a second instance of the workload to generate a second set of safety variables during the first time period; and
   a third processor core from the plurality of processor cores to generate a signal in response to comparison of the first set of safety variables and the second set of safety variables during a second time period, wherein the second time period follows the first time period, wherein an interconnect is to communicatively couple the first processor core and the second processor core to the third processor core.

2. The apparatus of claim 1, wherein the third processor core is to detect a mismatch between the first set of safety variables and the second set of safety variables within a process safety time interval.

3. The apparatus of claim 1, wherein a system on chip comprises the first processor core and the second processor core, wherein a safety island comprises the third processor core.

4. The apparatus of claim 3, wherein the system on chip and the safety island are coupled via the interconnect.

5. The apparatus of claim 4, wherein the interconnect comprises one or more of:
an on-chip system fabric, a Peripheral Component Interconnect express (PCIe), and a Controller Area Network (CAN) Bus.

6. The apparatus of claim 1, wherein a processor comprises the plurality of processor cores.

7. The apparatus of claim 1, wherein a System On Chip (SOC) device comprises the plurality of processor cores, memory, and a CAN Bus.

8. The apparatus of claim 1, wherein an Internet of Things (IoT) device or vehicle comprises one or more of: the plurality of processor cores and memory.

9. The apparatus of claim 1, wherein the vehicle is one of: an automobile, a truck, a motorcycle, an airplane, a helicopter, a vessel/ship, a train, or a drone.

10. The apparatus of claim 1, wherein the third processor core is to continuously operate to detect a mismatch between the first set of safety variables and the second set of safety variables within a process safety time interval.

11. An apparatus comprising:
a plurality of processor cores to execute one or more workloads corresponding to operations of one or more components of a vehicle; and
a first processor core from the plurality of processor cores to execute a first instance of a first plurality of workloads to generate a first set of safety variables during a time period;
a second processor core from the plurality of processor cores to execute a second instance of the first plurality of workloads to generate a second set of safety variables during the time period; and
a third processor core from the plurality of processor cores to generate a signal in response to comparison of the first set of safety variables and the second set of safety variables, wherein an interconnect is to communicatively couple the first processor core and the second processor core to the third processor core, wherein the interconnect comprises one or more of: an on-chip system fabric and a Peripheral Component Interconnect express (PCIe).

12. The apparatus of claim 11, wherein the third processor core is to detect a mismatch between the first set of safety variables and the second set of safety variables within a process safety time interval.

13. The apparatus of claim 11, wherein a system on chip comprises the first processor core and the second processor core, wherein a safety island comprises the third processor core.

14. The apparatus of claim 11, wherein the vehicle is one of: an automobile, a truck, a motorcycle, an airplane, a helicopter, a vessel/ship, a train, or a drone.

15. An apparatus comprising:
a first processor core of a first computing channel to execute a first instance of a first plurality of workloads during a time period;
a first processor core of a second computing channel to execute a second instance of the first plurality of workloads during the time period; and
an interconnect to couple safety islands of the first computing channel and the second computing channel,
wherein the first plurality of workloads correspond to operations of one or more components of a vehicle,
wherein the interconnect comprises one or more of: an on-chip system fabric, a Peripheral Component Interconnect express (PCIe), an I2C (Inter-Integrated Circuit) interface, and a SenseWire™ interface.

16. The apparatus of claim 15, wherein the interconnect is to communicate with a Serial Peripheral Interface (SPI).

17. The apparatus of claim 15, further comprising:
a first processor core of a third computing channel to execute a first instance of a second plurality of workloads; and
a first processor core of a fourth computing channel to execute a second instance of the second plurality of workloads,
wherein the interconnect is to couple safety islands of the third computing channel and the fourth computing channel.

18. The apparatus of claim 15, wherein the vehicle is one of: an automobile, a truck, a motorcycle, an airplane, a helicopter, a vessel/ship, a train, or a drone.

19. One or more computer-readable medium comprising one or more instructions that when executed on at least one processor configure the at least one processor to perform one or more operations to:
execute one or more workloads corresponding to operations of one or more components of a vehicle;
execute, at a first processor core of the processor, a first instance of a workload to generate a first set of safety variables during a time period;
execute, at a second processor core of the processor, a second instance of the workload to generate a second set of safety variables during the time period; and
cause generation of a signal, at a third processor core of the processor, in response to comparison of the first set of safety variables and the second set of safety variables, wherein an interconnect is to communicatively couple the first processor core and the second processor core to the third processor core, wherein the interconnect comprises one or more of: an on-chip system fabric and a Peripheral Component Interconnect express (PCIe).

20. The one or more computer-readable medium of claim 19, further comprising one or more instructions that when executed on the at least one processor configure the at least one processor to perform one or more operations to cause detection of a mismatch, at the third processor core, between the first set of safety variables and the second set of safety variables within a process safety time interval.

21. The one or more computer-readable medium of claim 19, further comprising one or more instructions that when executed on the at least one processor configure the at least one processor to perform one or more operations to cause transmission of data between two of the first processor core, the second processor core, and the third processor via the interconnect.

* * * * *